DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 20, 1970

870 O.G. 727

T870,018

METHOD FOR MANUFACTURING POLYOLEFIN STRAPPING

Paul K. Fain, Jr., P.O. Box 511, Kingsport, Tenn. 37662

Continuation of application Ser. No. 643,376, June 5, 1967. This application Aug. 25, 1969, Ser. No. 853,621

Int. Cl. B29c *17/14, 25/00;* B29d *7/24*

U.S. Cl. 264—146

No Drawing. 16 Pages Specification

An improved method for manufacturing strapping from polyolefins comprising, for example, the steps of (1) extruding a polyolefin into sheet form, (2) subjecting the extruded sheet material to a controlled temperature environment of between about 35° F. and about 200° F., (3) slitting the sheet into a plurality of straps while the sheet temperature is within the temperature range of the controlled temperature environment, (4) thereafter orienting the strapping, while in strap form, by drafting it at an elevated temperature, and (5) heatsetting the oriented strapping by exposing the straps to an intermediate temperature.